United States Patent [19]

Davenport et al.

[11] Patent Number: 5,222,793

[45] Date of Patent: Jun. 29, 1993

[54] REMOTE VEHICLE LIGHTING SYSTEM

[75] Inventors: John M. Davenport, Lyndhurst; Richard L. Hansler, Pepper Pike, both of Ohio

[73] Assignee: General Electric Company, Schenectady, N.Y.

[21] Appl. No.: 661,029

[22] Filed: Feb. 25, 1991

[51] Int. Cl.$^5$ .............................................. B60Q 1/00
[52] U.S. Cl. ...................................... 362/32; 362/61; 362/346
[58] Field of Search ................. 362/32, 61, 80, 263, 362/346, 350

[56] References Cited

U.S. PATENT DOCUMENTS

| | | | |
|---|---|---|---|
| 4,389,698 | 6/1983 | Cibie | 362/32 |
| 4,811,171 | 3/1989 | Viola | 362/61 |
| 4,811,172 | 3/1989 | Davenport et al. | 362/61 |
| 4,816,975 | 3/1989 | Bahnemann et al. | 362/346 |
| 4,851,969 | 7/1989 | Davenport et al. | 362/61 |
| 4,868,718 | 9/1989 | Davenport et al. | 362/32 |
| 4,912,605 | 3/1990 | Whitehead | 362/32 |
| 4,949,227 | 8/1990 | Finch et al. | 362/32 |
| 4,958,263 | 9/1990 | Davenport et al. | 362/61 |

FOREIGN PATENT DOCUMENTS

| | | | |
|---|---|---|---|
| 2651283 | 11/1978 | Fed. Rep. of Germany | 362/32 |
| 0124920 | 6/1986 | Japan | 362/32 |
| 2098311 | 11/1982 | United Kingdom | 362/61 |

Primary Examiner—Ira S. Lazarus
Assistant Examiner—Y. Quach
Attorney, Agent, or Firm—George E. Hawranko; Stanley C. Corwin

[57] ABSTRACT

An improved remote headlamp system includes a single light source operable in conjunction with a reflector arrangement constructed in a manner so as to generate at least two light spots from such single light source. These two light spots are picked up by the separate input ends of light transmissive elements such as optical fibers or light guides. The output ends of the light transmissive devices are directed to either side of the automobile with one side being imaged by a lens or mirror element to provide the spread portion of the standard pattern of road illumination and the other side being imaged by another lens or mirror element to provide the narrow, focused portion of the road illumination pattern. An arrangement for switching between high and low beam operation is also provided.

17 Claims, 6 Drawing Sheets

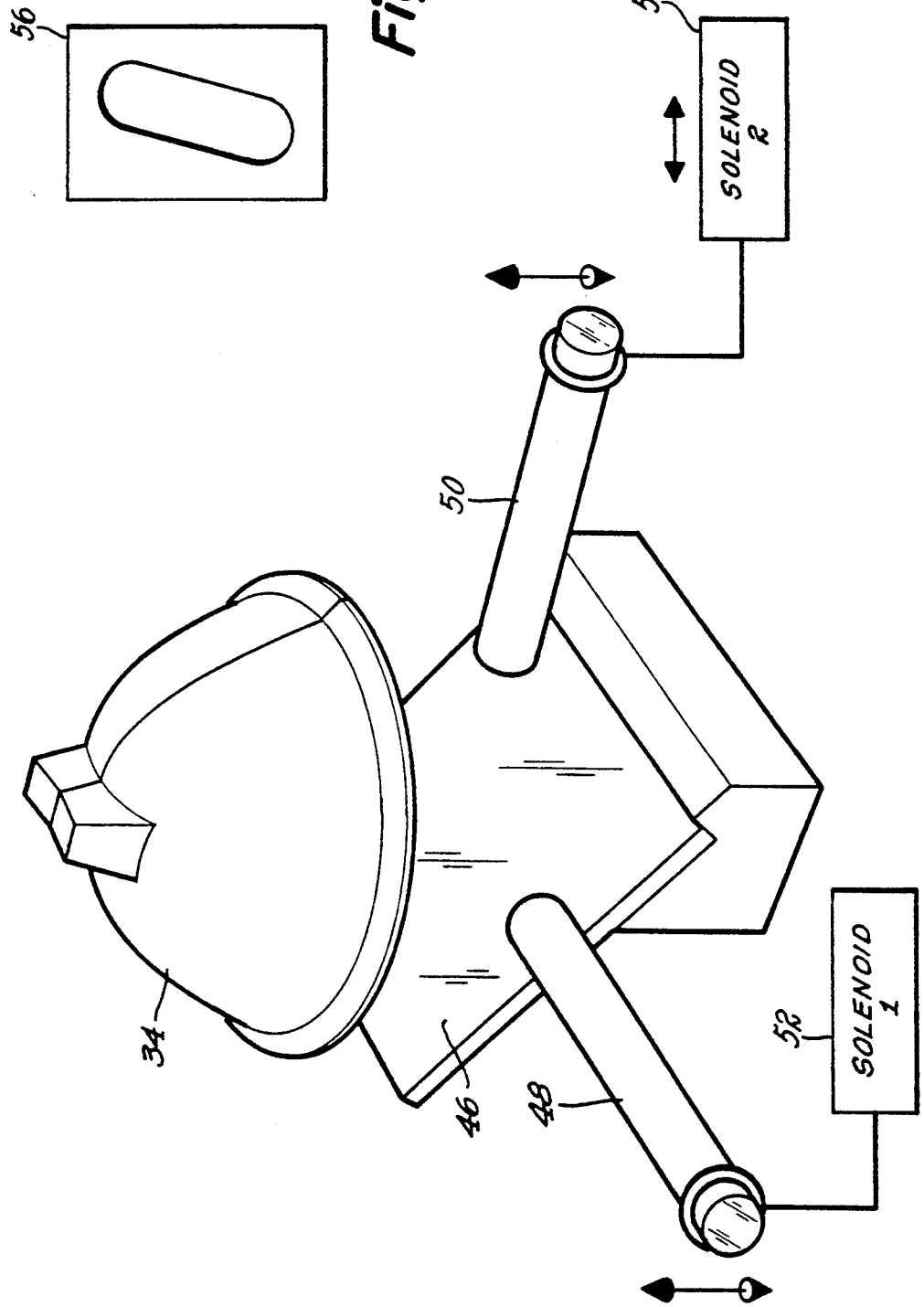

REMOTE VEHICLE LIGHTING SYSTEM

CROSS REFERENCE TO RELATED APPLICATIONS

U.S. patent application Ser. No. 07/660,388 entitled Improved Light Source Design Using An Elliptical Reflector, filed herewith and assigned to the same assignee as the present invention, is related to the present invention.

FIELD OF THE INVENTION

This invention relates to an improved remote microprojection headlamp system for an automotive forward lighting application. More particularly, this invention relates to such an improved headlamp system as utilizes a minimum number of components to achieve the necessary pattern of road illumination including both the high brightness and spread portions of such pattern.

BACKGROUND OF THE INVENTION

In the field of automotive lighting, there have been significant efforts directed to the purpose of reducing the overall number of lighting components as well as the size of such components that are necessary for achieving a proper pattern of road illumination. It is well recognized that by improving the front end profile of an automobile, a more efficient aerodynamic performance will result. This has appeal to the automotive industry because this improvement in turn, not only leads to improved fuel efficiency for that vehicle, but also provides more of an incentive to the automobile buyer looking for a more updated design.

In a typical automobile forward lighting arrangement, there can be up to four separate sources of light, one source for each automobile side (driver, passenger) and one source for the high beam and low beam functions on each side. Additionally, there is a need for reflector assemblies for each side of the automobile. It can be appreciated that with this many sources of light, in addition to the space and complexity such design requires, there is in the case of discharge sources in particular, the added disadvantage that the color of the light from the various sources can vary to the point that there is a considerable and apparent difference between such light sources. With the use of a typical discharge lamp for such source of light, should one of the lamps need replacing at a different time than the other lamps, this distinction in color as well as intensity can be very pronounced and quite a distraction to any driver approaching from the opposite direction. Of course, one way to avoid such color and intensity distinction as occurs when one lamp is replaced would be to replace all of the lamps, however, such a solution is obviously economically impractical.

One way to avoid the problem of color and intensity variations between lamps on a single vehicle would be to provide the vehicle with a single forward lighting source. A single source of light also has the advantage that once the light source is energized, it remains on regardless of whether the driver switches between low beam and high beam operation. In a typical multiple light source arrangement, there is a need to switch between an "on" and an "off" operation of the particular lamp for each conversion between low and high beam operation. The disadvantage with this approach is that this constant switching must be accomplished in a manner that ensures that the light output will be available in essentially an instantaneous manner. Also, this approach requires a constant switching operation for the ballast circuit which is driving the light source.

Accordingly, one approach to reducing the overall size requirements for an automotive forward lighting application and to avoid the above described disadvantages of utilizing a multiple light source arrangement would be to utilize a single source of light and a light distribution arrangement utilizing optical fibers. By using this approach, the light source portion of the system can be moved to a position remote from the front end of the automobile thereby allowing that the light output can be distributed to the various positions as necessary by means of a fiber optic/light guide arrangement. An example of such an approach can be found in U.S. Pat. Nos. 4,811,172 and 4,958,263 issued to Davenport et al and assigned to the same assignee as the present invention.

It would be further advantageous of a system that utilizes a single light source if such system also minimized the number of components necessary to distribute the light output in a manner to achieve the light pattern illumination required by the Society of Automotive Engineers standards. It is known that by using optical fibers for channelling the light output to locations remote from the source that there are losses associated with the transmission of light through long lengths of fiber optic cables. Therefore, it would also be advantageous if a system using a single light source could be constructed in a manner to require as little amount or distance of fiber optic cable as possible while still achieving the benefit of the remote location of the light source.

Referring once again to the SAE standards for the pattern of road illumination for an automobile forward lighting application, the considerations that a lighting designer must keep in mind when trying to improve the system of automotive forward lighting are such that there are essentially two components of the pattern of road illumination that must be achieved. The first of these components is the high brightness or "punch" component which is defined in terms of lumens per steridian and which provides a more focussed, narrow beam of light near the center of the pattern. The second component is the "spread" light which, as the name implies, is the light which is spread on a broader pattern across the road and is measured in terms of total lumen output of the forward lighting system.

Presently, to achieve this pattern of road illumination, a mirror and lens element is provided at each of the light sources. This mirror and lens element typically contains a complex array of reflective surfaces or refractive elements that all interact in a manner to sum the individual light components into a composite light output which includes both punch and spread portions of the illumination pattern. The light outputs from each of the separate light source/lens arrangements can then be superimposed in a manner to achieve an overall pattern of road illumination in compliance with the SAE standards.

It would be advantageous and extremely cost effective if a lighting arrangement were developed which would avoid the need for having multiple lens elements of such a complex nature. Furthermore, if such a new automotive forward lighting arrangement were developed, it would be advantageous if such lighting arrangement could more precisely achieve both the punch and spread components in a manner that would avoid having the spread portion extend too far upward and into the path which could distract drivers in the opposite direction.

A further advantage to the use of a single source of light disposed in a location remote from the point at which the light is output is that because of environmental concerns over the harm that may be caused by materials used in automotive heating and cooling systems, a less efficient and more bulky material may be used in place of materials considered harmful to the environment. Accordingly, by removing the light source from the front of the vehicle thereby reducing the amount of space needed for the lighting operation in this front area, automotive designers can more effectively put this space to use for other critical purposes. Additionally, by disposing the single light source in a position remote from the front end point of delivery, the light source can be made more collision resistant; that is, in a minor collision there may be no damage to the light source if it is disposed in a more protected area.

SUMMARY OF THE INVENTION

It is therefore an object of this invention to provide an improved remote micro-projection headlamp system for automotive applications, which headlamp system achieves the necessary pattern of road illumination by utilizing a minimum number of components in a minimum amount of space.

It is a further object of this invention to provide such a headlamp system which allows for the remote disposition of the light source and yet requires only the minimum amount of fiber optic cabling such that the amount of light loss attributable to such fiber optic cabling is reduced to a minimum thereby.

It is yet another object of this invention to provide such a headlamp system as provides the necessary pattern of road illumination without the need for complicated lens structures and which accomplishes this road illumination pattern without generating an amount of spread light which can obstruct the vision of a vehicle approaching in the opposite direction.

Still another object of the invention is to provide such a headlamp system as can achieve the operation between high and low beam functions using a single light source, a minimum amount of fiber optic cabling as well as a minimum number of components to achieve the switching between high and low beam operation.

In accordance with the principles of the present invention there is provided a remote headlamp system which utilizes a single source of light in conjunction with an ellipsoidal reflector element that can provide a split image of the light at the second optical focal point of the reflector, which split image is generated by the single light source disposed at the first optical focal point of the reflector. The input ends of at least two optical fibers are disposed at these two light spots with one optical fiber then being channelled to the driver's side of the automobile and one going to the passenger side. Additionally, a first lens element is disposed at the output end of one of the optical fibers, which first lens element performs the function of spreading the light output so as to provide the spread light portion of the pattern of road illumination. A second lens element is disposed at the output end of the second optical fiber and is constructed so as to generate the bright spot or "punch" portion of the road illumination pattern. The headlamp system further includes an arrangement for switching between high and low beam operation.

The headlamp system may also be constructed so that the light source is disposed on one side of the automobile and the one light spot is coupled directly to the particular lens without the need for an intervening optical fiber. In this manner the headlamp system can function with having only one optical fiber thereby reducing the effects of light loss over optical fibers.

BRIEF DESCRIPTION OF THE DRAWINGS

FIG. 5 is an elevational view of a headlamp system having a second alternate beam switching arrangement constructed in accordance with the invention.

FIG. 6 is a sectional view of a guideplate which is operable in connection with the beam switching arrangement of FIG. 5.

DESCRIPTION AND OPERATION

Figure 1:
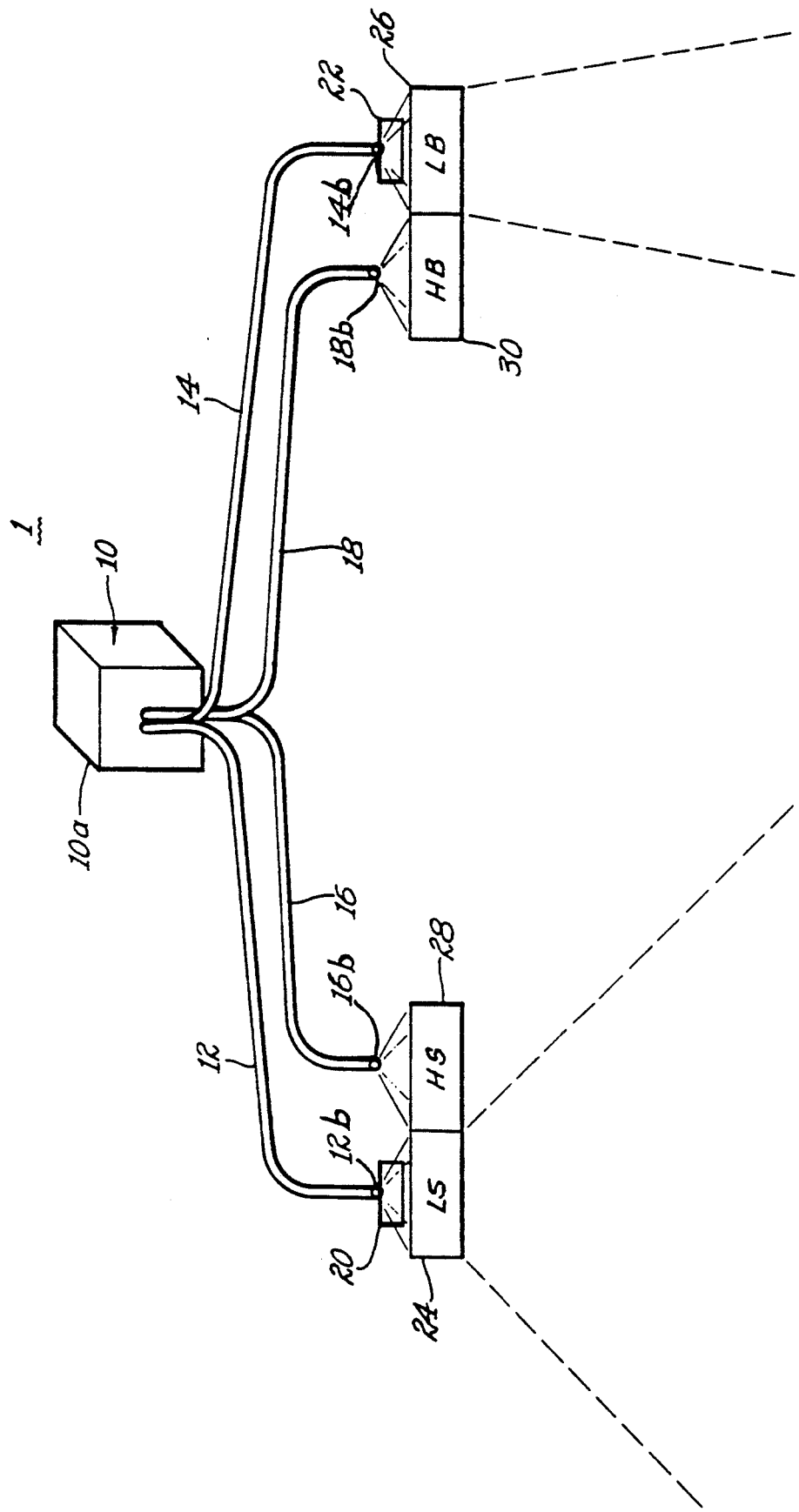
FIG. 1 is an elevational view partly in block diagram form of a remote micro-projection headlamp system constructed in accordance with the present invention.

As seen in FIG. 1, the remote micro-projection headlamp system 1 for an automotive forward lighting application includes a source of light illustrated here as reference 10. Though the following discussion will be primarily directed to automotive lighting, it should be understood that the principles of the present invention apply equally as well to all types of vehicle lighting including boating as well as aircraft. For purposes of describing the system operation of the present invention, it should be understood that the view shown in this figure is one looking into the forward lighting arrangement at the front end of the automobile. As such, the lens elements shown at the right side of the figure are on the driver's side of the automobile while the lens elements shown on the left side of the figure correspond to the passenger side of the automobile. Of course it can be appreciated that the lens functions which will be described hereinafter will be reversed for countries in which the driver side is opposite to that described herein.

The internal configuration of the light source 10 will be described in relation to FIGS. 2 and 2a and later in relation to FIG. 7, however, in describing FIG. 1, it should be understood that the light source 10 functions to generate two light spots internally of the light box 10a. A first pair of optical fibers 12, 14 are disposed such that their respective input ends 12a, 14a receive the light from one of the two light spots generated within the light source 10. It should be understood that although the term "optical fibers" has been used previously, this invention relates to all types of light transmissive arrangements. In fact the term optical fiber is meant to include optical light guides which are generally considered to be larger in diameter than fibers; the light guide can also be hollow. One of the first pair of optical fibers 12 extends from the light source 10 to the left or passenger side of the automobile. The second one of the first pair of optical fibers 14 extends to the right or driver's side of the automobile. The first pair of optical fibers 12, 14 are associated with the low beam mode of operation. A second pair of optical fibers 16, 18 are coupled to the light source 10 such that their respective input ends 16a, 18a receive light from the second of the light spots generated by the light source 10. The first one of the second pair of optical fibers 16 extends to the left or passenger side of the automobile while the second one of the second pair of optical fibers 18 extends to the right or driver's side. The second pair of optical fibers 16, 18 are associated with the high beam mode of lighting operation. Disposed at the output ends 12b and 14b of each of the first pair of optical fibers is a respective mask element 20, 22 which is effective for providing a glare free region above horizontal. The optical fibers that are utilized for the present invention are large fibers having a diameter of approximately 8-12 mm. In this manner, a more efficient coupling of the light from the two light spots to the input ends of the optical fibers can be achieved over that which would result using a bundle of smaller diameter optical fibers.

The light transmitted from the output ends 12b, 14b of the first pair of optical fibers passes through the respective mask elements 20, 22 on either side of the automobile and is then imaged by the respective first and second low beam lens elements 24, 26. It should be understood that the refractive properties of a lens could be equally provided for by means of the reflective properties of a mirror. Accordingly, the present invention would apply equally to a mirror arrangement for providing the necessary road illumination pattern. To make a good pattern of road illumination, a headlamp system must provide a high brightness or "punch" portion as it is known in the art, near the center of the pattern and a large amount of spread light over the entire pattern of road illumination. The left side low beam lens element 24, designated LS for low beam spread light, is constructed so as to produce a wide, spread pattern of road illumination. Typically, this can be accomplished by using a cylindrical lens. As seen in FIG. 1, the LS lens element 24 is dedicated to providing only the spread portion of the overall pattern of road illumination. This contrasts with a typical headlamp system in which each lighting position provides a composite light output which contains both the spread and punch portions of the overall pattern of road illumination. The right side low beam lens element 26, designated LB for low beam bright light, is constructed to produce a narrow, focussed bright pattern of road illumination. The LB lens element shown in FIG. 1 can be achieved by use of an aspheric lens and is dedicated to providing only the bright, punch light portion of the pattern of road illumination.

The light transmitted from the output ends 16b, 18b of the second pair of optical fibers is coupled directly to the respective first and second high beam lens elements 28, 30. Similar to the dedicated functions performed by the LS and LB lens elements 24, 26 for the low beam operation, the high beam lens elements also perform dedicated functions. The left side high beam lens element 28, designated HS for high beam spread light, is constructed so as to produce the high beam version of the wide, spread pattern of road illumination. As with the LS lens element 24, this high beam spread function can be achieved by the use of a cylindrically shaped HS lens element 28. The right side high beam lens element 30, designated HB for high beam bright light, is constructed to produce the narrow, focussed bright portion of the pattern of road illumination for the high beam operation. The HB lens element 30 shown in FIG. 1 can also be achieved by use of an aspheric lens.

FIG. 1 further illustrates in dotted line form, the distinction between the spread and punch portions of the road illumination pattern. It can be seen that the punch portion on the driver's side is shown in heavier dotted lines to signify that this portion is more concentrated. It can also be seen that by providing the narrow, focussed pattern on the driver's side, there is a minimum amount of light that extends beyond the vertical plane created relative to earth by the driver's side of the automobile. In this manner, a driver in an adjacent but oppositely heading direction will not be adversely affected by the light from this headlamp system. Additionally, disposing only the punch light on the driver's side has the further advantage that, under extreme weather conditions, there is a minimum amount of glare reflected back to the driver by snow or other moisture on the side of the road. It can be appreciated that in such inclement weather conditions, a wide spread of light on the driver's side could result in a troublesome glare situation for the driver.

As further seen in FIG. 1, the superimposition of the punch and spread portions of the overall pattern of road illumination is achieved in front of the remote headlamp system of the present invention and, in so doing, all standards for the punch and spread portions of the pattern of road illumination are still satisfied.

An alternate system arrangement for the present invention can include a source of light (not shown) provided as a redundant or backup source to be used in the event of failure of the primary light source 10. To save on space, it is possible to provide this redundant or backup light source in a manner so as to utilize only one arrangement of reflectors and optical fibers; this could be done by having a solenoid actuated device (not shown) which would move the backup light source (or lamp) into the position of the first light source 10. Other arrangements for providing a backup system are contemplated by the present invention as well; for instance, a backup system could consist of an entire lamp, reflector lens and optical fiber arrangement.

Figure 2:
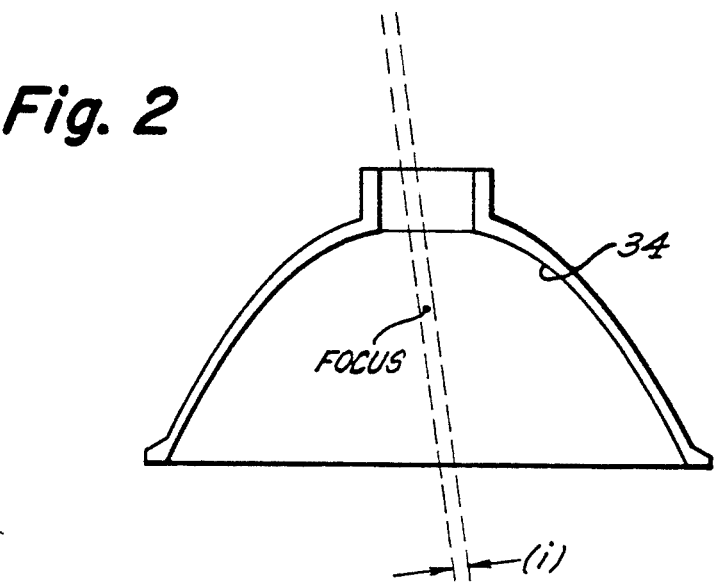
FIGS. 2 and 2a are elevational views in section of the one type of reflector arrangement used to develop the split image in accordance with the principles of the present invention.
Figure 2A:
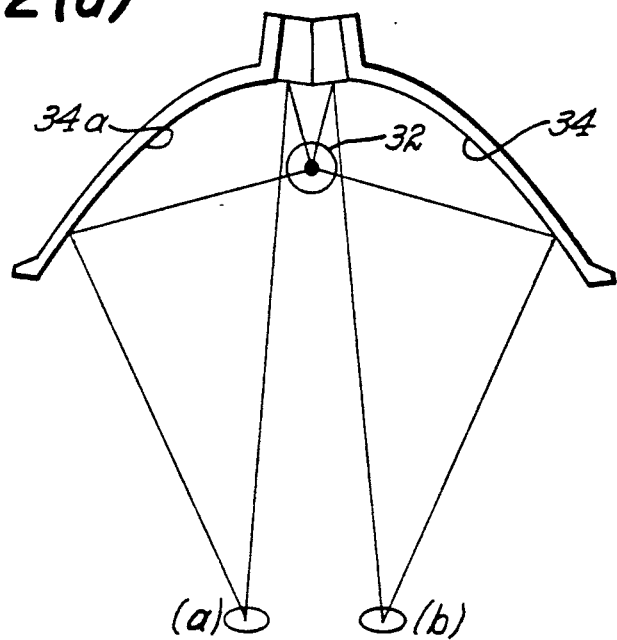

Referring now to FIGS. 2 and 2A, it can be seen that the function of providing a light source 10 which achieves a light output having two light spots utilizes a single metal halide arc tube shown in FIG. 2A as a lamp designated reference 32 and a split reflector shown as reference 34. As seen in FIG. 2, a standard elliptical reflector can be utilized to construct the split reflector 34 of the present invention. By slicing the standard reflector at an angle approximately at the longitudinal axis of the reflector and joining slice portions such that there is a noncontinuous inner elliptical surface, the split reflector 34 of the present invention is achieved. As shown in FIG. 2, the left hand section from a first cutting operation would be set aside and a second similar cutting operation would be performed on a second standard elliptical reflector. The left hand portion of that reflector could the be flipped over and joined to the first left hand portion previously set aside thereby forming the noncontinuous inner elliptical surface. The splitting operation must be through the focal point such that when rejoined, the sliced portions share the same first optical focal point. Although the above discussed slicing operation is one way of constructing the split reflector 34, it can be appreciated that the preferred way of producing the split reflector 34 in production quantities is to utilize a mold process that results in the formation of the split reflector in a single step process. During the manufacturing process utilized for producing the split reflector 34, it would be advantageous to include the step of providing the inner reflective surface 34a with a coating of a multilayer dielectric filter. By so doing, the infrared and ultraviolet light components generated by the lamp 32 are prevented from adversely affecting the input ends 12a, 14a, 16a, 18a of the optical fibers. It is known that excess IR and UV radiation can melt optical fibers made of plastic and can also cause discoloration of the optical fibers.

The lamp 32 shown in FIG. 2a can be a metal halide arc tube having a high pressure fill of Xenon to insure the substantially instantaneous start required upon demand for automotive lighting. The lamp 32 is disposed within the split reflector 34 at the first common optical focal point of the two segments that make up reflector 34. An example of a metal halide arc tube having a high pressure fill of Xenon can be found in U.S. Pat. No. 4,968,916 issued to Davenport et al. and assigned to the same assignee as the present invention. This lamp 32 is particularly suited for an automotive application because of its performance characteristics when operating under a DC voltage, supply arrangement. Though not shown in FIG. 2a, it is understood that the lamp 32 of the present invention is similarly energized; that is, since this is an automotive application, the source of energy for lighting is derived from the automobile battery (not shown) and a ballast arrangement (not shown).

The light pattern generated by the lamp 32, reflector 34 configuration of FIG. 2a is illustrated in a solid line representation. It can be seen by this illustration that the light output of the lamp 32 is reflected by the split reflector 34 in such a manner so as to achieve multiple light spots shown here as consisting of two light spots (a) and (b). The two light spots (a) and (b) are generated at the second optical focal point of the split reflector 34. It should be understood that alternate arrangements utilizing additional light spots are possible; for instance, it is possible to generate four light spots corresponding to the typical four light portions of an automobile.

It should be further understood that though the two light spots (a) and (b) are generated by the illustrated preferred embodiment of the invention, there are other techniques that can be utilized to achieve multiple light spots at the second optical focal point of the reflector and that such other techniques are contemplated as being within the scope of the present invention. For example, a normal elliptical reflector and a U-shaped mirror member intersecting the second optical focal point could generate two light spots. Additionally, a beam splitter utilizing an elliptical reflector and filter arrangement could also be utilized.

It should also be noted that the remote lighting arrangement of the present application is not limited in application to a vehicle forward lighting situation. The light generated and split into at least two spots for distribution through the vehicle can also perform the lighting functions needed for instrument lighting, overhead or other convenience lighting, rearward lighting as well as forward lighting. Preferably, the light from each of the separate light spots will be dedicated to a specific one of the above vehicle lighting operations.

Figure 3:
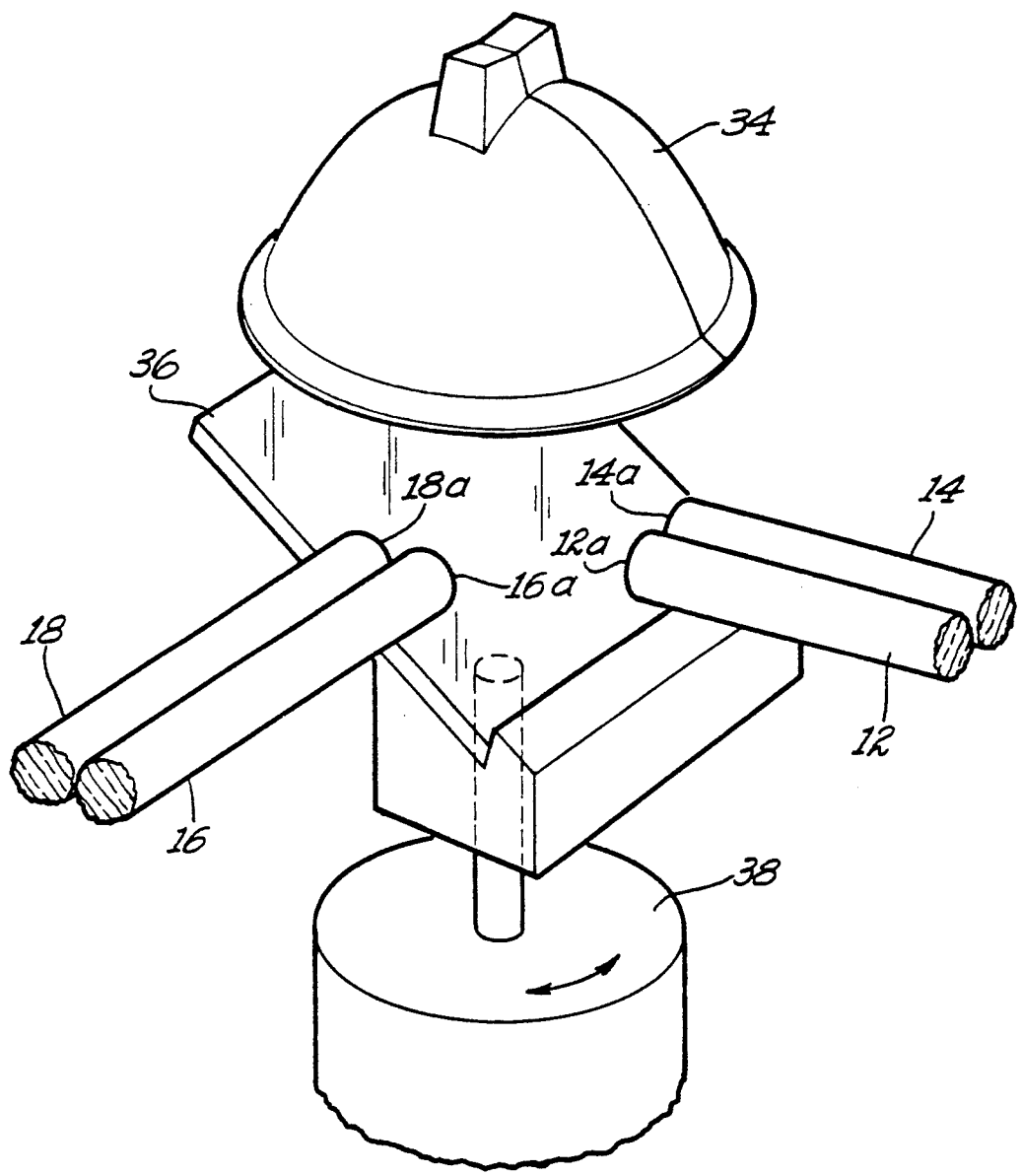
FIG. 3 is an elevational view of a headlamp system having a beam switching arrangement constructed according to the invention.

As seen in FIG. 3, one way of achieving the switching between the high and low beam modes of operation for a remote micro-projection headlamp system using optical fibers would be to locate a mirror element 36 at the second optical focal point of the split reflector 34. The mirror element 36 is disposed at an angle relative to the downward facing split reflector 34 such that the two light spots (a) and (b) can be reflected directly into the input ends of the horizontally disposed first or second pairs of optical fibers depending on the mode of operation selected and the positioning of the mirror element 36. In the first position as shown in FIG. 3, the mirror element 36 is effective for reflecting the two light spots (a) and (b) into the first pair of optical fibers 12, 14 in order to perform the low beam operation. It can be appreciated that the optical fibers 12 and 14 extend to the opposite sides of the automobile as described in relation to the system of FIG. 1.

In order to switch to the high beam operation, a solenoid actuated mirror rotation device 38 is actuated such that the mirror element 36 is rotated to a second position. In the second position, the mirror element 36 is effective for reflecting the two light spots (a) and (b) into the input ends of the second pair of optical fibers 16, 18. Each one of the second pair of optical fibers 16, 18 extend to opposite sides of the automobile as described in relation to FIG. 1. The distinction in the aiming characteristics between the high and low beam modes of operation are accommodated at the lens elements in a conventional manner.

An advantage of the beam switching arrangement as shown in FIG. 3 is that the lamp 32 disposed within the split reflector 34 remains on at all times during operation of either the low or high beam delivery. In this manner, there is no concern as to meeting instant "on" requirements of a lamp that is dedicated to only the high or low beam operation and must be switched from the "off" to the "on" condition immediately upon demand. Additionally, by remaining in the "on" condition during switching between high and low beam operation, there is less demand placed upon the ballast circuit (not shown) which provides energy for operation of the lamp 32. Furthermore, similar to the multilayer dielectric coating applied to the inner reflective surface 34a of the split reflector 34, the mirror element 36 can be similarly coated to prevent the adverse effects of IR or UV radiation.

Figure 4:
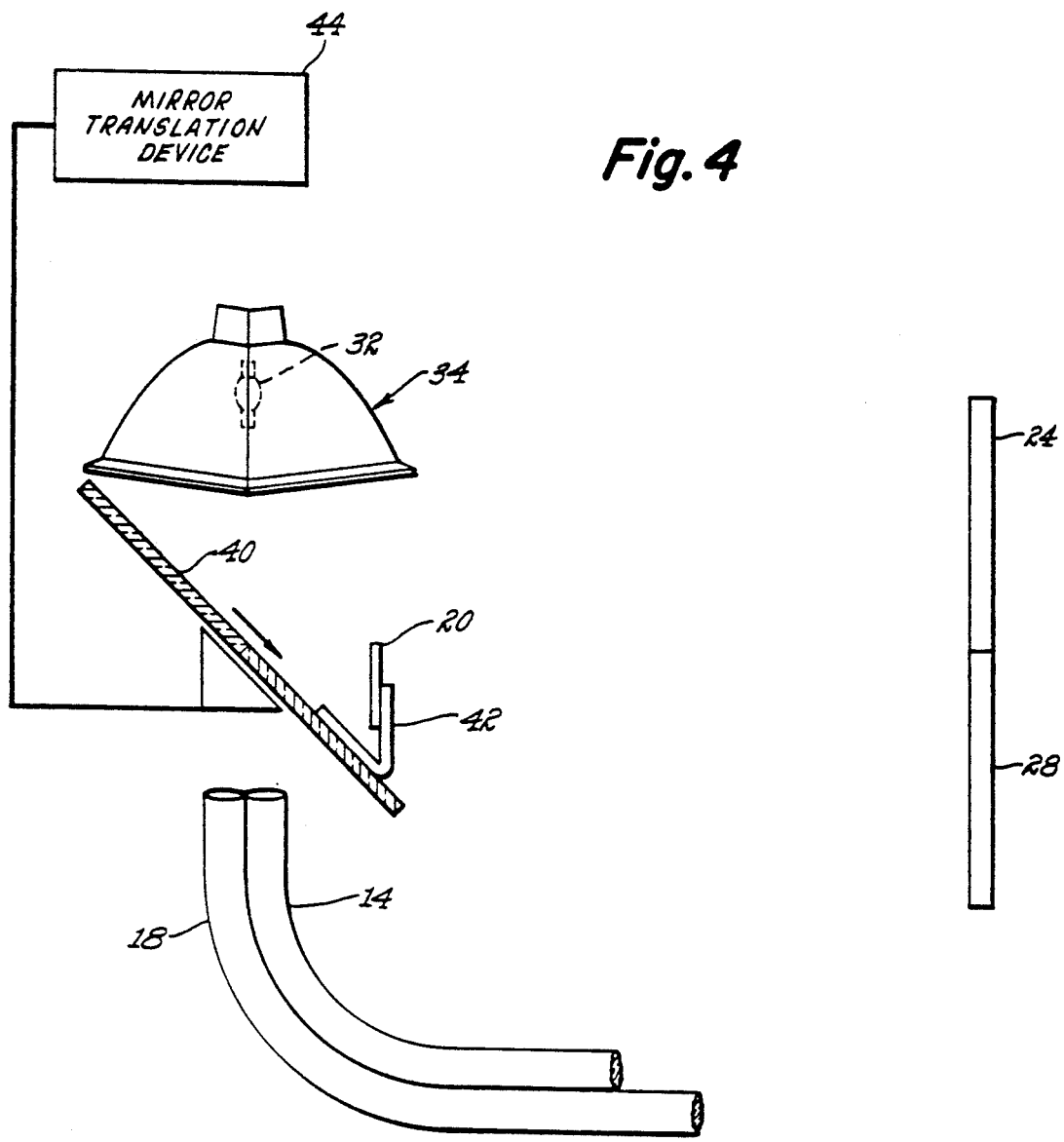
FIGS. 4 and 4a are elevational views of a headlamp system having an alternate beam switching arrangement constructed in accordance with the invention.
Figure 4A:
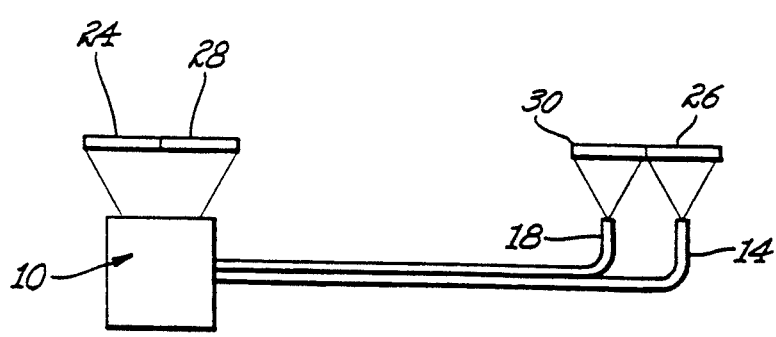

An alternate arrangement for switching between the high and low beam mode of operations is shown in FIG. 4 and 4a in which the principle feature is that instead of reflecting all of the light from the two light spots (a) and (b) to the input ends of the optical fibers, a beam splitting arrangement is utilized to reduce the amount of optical fiber cabling that is needed for the headlamp system of the present invention. FIG. 4a illustrates a headlamp system which disposes the light source 10 on one side of the automobile such that the light output is coupled directly to the LS or HS lens elements 24 or 28 depending on whether low beam or high beam operation has been selected. FIG. 4a further illustrates that only optical fibers 14 and 18 are needed to couple light output to the LB or the HB lens element 26 or 30 again depending on the selection between low or high beam operation.

The manner of achieving this reduced optical cabling configuration is illustrated in FIG. 4 in which the downward facing split reflector 34 and lamp 32 configuration produces the two light spots (a) and (b) onto both a split mirror 40 and the input end of one of the pair of optical fibers 14, 18. The split mirror 40 is movable between a first, or upper position corresponding to low beam operation and a second, or lower position corresponding to high beam operation. In the upper position of split mirror 40, light from one of the light spots (a) or (b) is reflected onto the LS lens 24 while in the second or lower position, light from this same light spot is reflected onto the HS lens 28. The movable split mirror 40 can be made movable between this first and second position by means of a conventional solenoid actuated positioning device 44. Additionally, the split mirror 40 can have secured thereto by means of a latching device 42, the mask member 20 described in relation to the system of FIG. 1. The other light spot (a) or (b) which is not intercepted by the split mirror 40 is coupled to the input end of the pair of optical fibers 14 or 18 depending on the selection between low and high beam selection. The split mirror 40 also serves to block or enable transmission of light through to the necessary optical fiber input end depending on the selection between low and high beam operation for the driver's side of the automobile at which the punch pattern of road illumination is produced. It should be noted that the preferred position of the light source 10 is on the passenger side because it is preferred to have the spread pattern generated by the less efficient direct coupling arrangement shown herein. However, it is also possible to dispose the light source 10 on the driver's side to produce the punch pattern directly.

Referring now to FIG. 5, another arrangement for providing a remote micro-projection headlamp system having switching capabilities between low and high beam operation and still maintaining operation using a minimum amount of optical fiber cabling is disclosed. In the configuration illustrated in FIG. 5, the two light spots (a) and (b) produced by the downward facing split reflector 34 and lamp 32 configuration is reflected into a fixed position mirror 46 disposed at an angle relative to the optical fibers 48, 50. In this configuration, a single optical fiber 48 or 50 extends from the light source to the respective sides of the automobile to perform both the low and high beam delivery. The manner of switching between such two modes of delivery is accomplished by manipulation of the output ends of the two optical fibers 48, 50. Since the difference between delivering the light output as a high beam and a low beam is the trajectory output of such light, by moving the optical fiber end, this distinction can be met. Accordingly, the embodiment disclosed in FIG. 5 includes a first and a second solenoid member 52, 54 for performing such manipulation upon demand. It it known that to achieve high beam operation for the punch light, two things must be done. First, the mask 20 which produces the cutoff must be removed and second the bright spot must be moved from one and one-half degrees down and two degrees to the right, to the straight-ahead position. By moving the optical fiber output end according to this relation and moving the mask element 20, the transition between low and high beam operation and vice-versa is accomplished.

The motion specified above is appropriate for the system in which the punch light in the beam is formed by imaging the end of the optical fiber with an aspheric lens such as the LB or HB lens 26, 30. However, for the spread pattern, the same motion might be used although it is possible to achieve the transition merely by moving the output end of the optical fiber in the vertical direction only. As seen in FIG. 6, it is possible to utilize guide plates 56, 58 in conjunction with the ends of the optical fibers of the embodiment shown in FIG. 5. In this manner, the output ends are prevented from straying to any position other than the precise positions which distinguish between the high and low beam operations.

Figure 7:
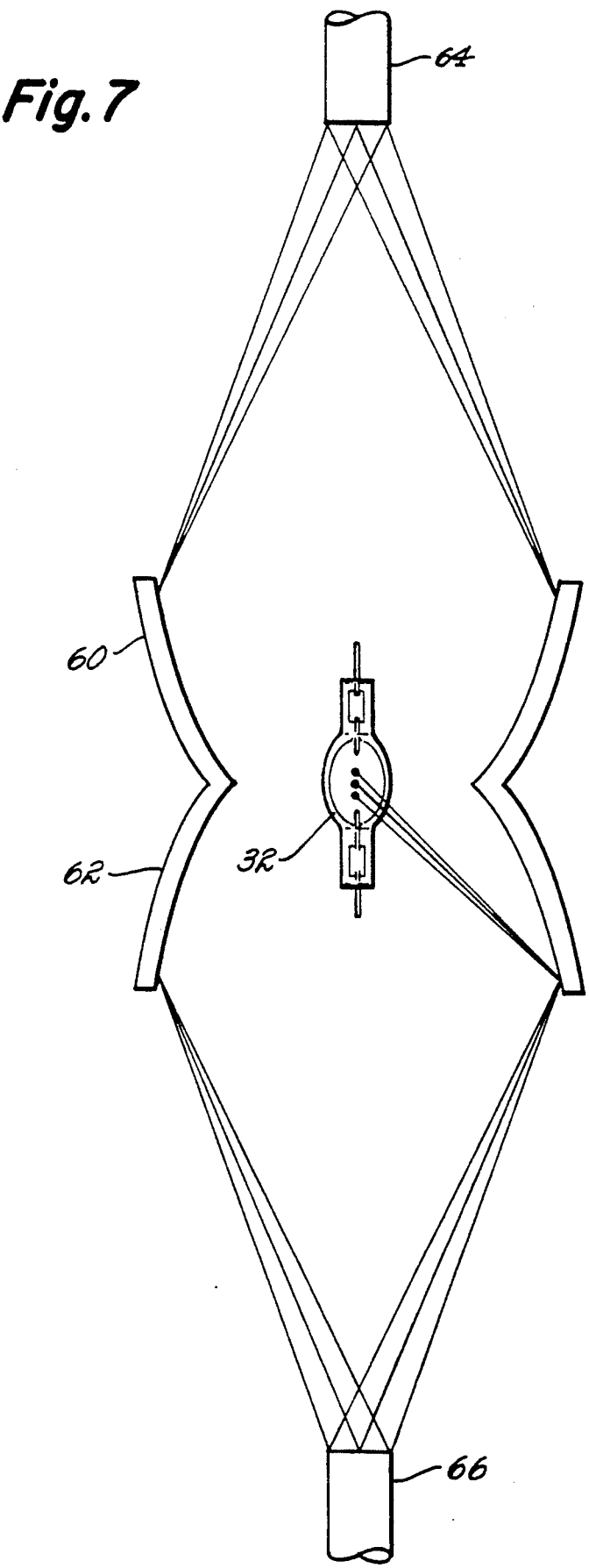
FIG. 7 is an elevational view partly in section of a headlamp system having an alternate type of reflector arrangement used to develop the split image in accordance with the principles of the present invention.

As seen in FIG. 7, an alternate source and reflector arrangement for providing two light spots (a) an (b) to the input ends of separate optical fibers 64, 66 includes a single lamp 32 disposed centrally at a point where two cut elliptical reflectors 60, 62 are rejoined. Utilizing the approach illustrated in FIG. 7 minimizes the size of the light spots (a) and (b); that as the high magnification images that may otherwise be present are eliminated.

The first focus of each elliptical reflector segment 60, 62 is located half way between the center of the lamp 32 and the corresponding end of such lamp 32. In other words, the cut in each elliptical reflector segment 60, 62 is made slightly toward the closed end of the elliptical reflector from the focal point. The advantage of this approach is that only those portions of the elliptical reflector 60, 62 having the smaller magnification are used thereby keeping the size of the light spots (a) and (b) smaller and allowing the use of smaller diameter optical fibers 64, 66.

Although the present invention has been described in connection with a number of different embodiments, it is understood that other embodiments may be practiced without departing from the scope of the present invention as detailed in the appended claims. For instance, it may be possible to practice the present invention using as the light source, a high intensity incandescent lamp. Additionally, there are possible other alternate embodiments of a split light image using a minimum number of sources and then using the split light image to perform punch and spread pattern illumination on either side of the automobile. Using this approach, a single ballast could provide energy to two separate lamp and dual optical fiber configurations thereby eliminating the need for moving parts.

What we claim as new and desire to secure by Letters Patent of the United States is:

1. A lighting apparatus for providing light output to remote locations of a vehicle comprising:
   means for generating light;
   a reflector element having at least one optical focal point associated therewith, said light generating means being disposed substantially at a first one of said at least one optical focal point of said reflector element;
   said reflector element being constructed in a manner such that, with said light generating means disposed substantially at said first one of said at least one optical focal point, at least two distinct light spots are generated at a second one of said at least one optical focal point of said reflector element; and
   light distribution means cooperatively engaging said reflector element and effective for distributing light from one of said at least two distinct light spots to an output located at one side of said vehicle and for distributing light from a second one of said at least two distinct light spots to another output located at another side of said vehicle opposite to said one side.

2. A lighting apparatus as set forth in claim 1 wherein said light generating means is at least one metal halide arc tube energized by a voltage supply means associated with said vehicle.

3. A lighting apparatus as set forth in claim 1 wherein said reflector element is an elliptical reflector.

4. A lighting apparatus as set forth in claim 1 wherein said light distribution means includes an optical fiber disposed between said one of said at least two distinct light spots and said one side of said vehicle.

5. A vehicle lighting apparatus as set forth in claim 4 wherein said light distribution means further includes a second optical fiber disposed between said second one of said at least two distinct light spots and said opposite side of said vehicle.

6. A vehicle lighting apparatus as set forth in claim 1 further comprising means for outputting light from said vehicle such that a road illumination pattern having a narrow, focused spot portion and a spread portion is achieved; said narrow, focused spot portion being generated by light output from said one side of said vehicle and said spread portion being generated by light output from said opposite side of said vehicle.

7. A lighting apparatus as set forth in claim 6 wherein said narrow, focussed spot portion is achieved by means of an aspheric lens being disposed at an output of said light distribution means.

8. A lighting apparatus as set forth in claim 6 wherein said spread portion of said light output is achieved by disposing a cylindrical lens at an output of said light distribution means.

9. A lighting apparatus as set forth in claim 6 further comprising a mask element disposed at an output of said light distribution means to prevent glare.

10. A lighting apparatus as set forth in claim 1 wherein said light distribution means is effective for distributing light in an forward direction of said vehicle and further wherein said lighting apparatus further comprises means for switching between a high beam and a low beam of operation.

11. A lighting apparatus as set forth in claim 10 wherein said light distribution means includes a mirror element disposed at said second optical focal point such that said at least two light spots are reflected into at least a first and a second optical fiber.

12. A lighting apparatus as set forth in claim 11 wherein said switching means includes means for moving said mirror element from a first position corresponding to a low beam operation and a second position corresponding to a high beam operation.

13. A lighting apparatus as set forth in claim 11 wherein at least one of said mirror element and said reflector element is provided with a dielectric filter to reduce infrared and ultraviolet light incident on the input ends of said at least first and second optical fibers.

14. A remote headlamp apparatus for the forward lighting system of a vehicle comprising:
means for generating a light output;
light reflecting means cooperatively engaging said light output generating means and being effective for reflecting said light output into at least two light spots;
light distribution means cooperatively engaging said light reflecting means and effective for distributing light from one of said at least two light spots to one side of said vehicle and for distributing light from a second one of said at least two light spots to another side of said vehicle opposite said one side; and
light directing means cooperatively engaging said light distribution means and effective for directing the light from said one side of said vehicle in a narrow, focussed pattern and for directing light from said opposite side of said vehicle in a spread pattern.

15. A lighting apparatus for providing light output to remote locations of a vehicle comprising:
means for generating light;
a reflector element having at least one optical focal point associated therewith, said light generating means being disposed substantially at a first one of said at least one optical focal point of said reflector element;
said reflector element being constructed in a manner such that, with said light generating means being disposed substantially at said first one of said at least one optical focal point, at least two light spots are generated at a second one of said at least one optical focal point of said reflector element; and
light output means including at least a first and a second lens element, said light output means cooperatively engaging said reflector element such that light from one of said at least two light spots is output through said first lens element to form a focussed, narrow pattern of road illumination, said light output means being further effective such that light from a second one of said at least two light spots is output through said second lens to form a spread pattern of road illumination, said light output means being further effective such that said focussed, narrow pattern of road illumination and said spread pattern of road illumination are effectively summed in front of said vehicle such that a composite pattern of road illumination is formed thereby.

16. A lighting apparatus as set forth in claim 15 further comprising light distribution means for channelling light output from said at least two light spots to said light output means, said light distribution means including at least one optical fiber.

17. A remote lighting apparatus for a vehicle comprising:
means for generating light;
light reflecting means cooperatively engaging said light generating means and being effective for reflecting light output from said light engaging means into at least two distinct light spots; and
means for distributing light from said at least two distinct light spots to different positions within said vehicle, said different positions corresponding to different lighting operations associated with said vehicle.

* * * * *